United States Patent
Kaminski et al.

(10) Patent No.: US 6,816,978 B1
(45) Date of Patent: Nov. 9, 2004

(54) SYSTEM AND METHOD FOR ADJUSTING AN INPUT VOLTAGE TO A SWITCHING POWER SUPPLY WHILE KEEPING THE OUTPUT VOLTAGE CONSTANT

(75) Inventors: George A. Kaminski, Houston, TX (US); George F. Squibb, Spring, TX (US); Mark R. Trace, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 549 days.

(21) Appl. No.: 09/589,422

(22) Filed: Jun. 7, 2000

(51) Int. Cl.[7] .............................. G06F 11/30; H02J 1/00
(52) U.S. Cl. ...................... 713/340; 713/300; 713/330; 307/31
(58) Field of Search .............................. 713/300, 323, 713/330, 340, 400, 500; 363/24, 25, 26, 240, 134; 323/272, 267; 307/24, 26, 29, 31, 32, 33, 34, 35; 348/607

(56) References Cited

U.S. PATENT DOCUMENTS

| | | | | |
|---|---|---|---|---|
| 4,034,232 A | * | 7/1977 | LaVenture | 307/32 |
| 5,045,712 A | * | 9/1991 | Baggenstoss | 307/29 |
| 6,043,634 A | * | 3/2000 | Nguyen et al. | 323/272 |
| 6,160,591 A | * | 12/2000 | Stumfall et al. | 348/607 |
| 6,195,273 B1 | * | 2/2001 | Shteynberg | 363/26 |
| 6,437,548 B2 | * | 8/2002 | Aas et al. | 323/272 |
| 6,519,707 B2 | * | 2/2003 | Clark et al. | 713/322 |

FOREIGN PATENT DOCUMENTS

JP             04180111 A    *   6/1992        G06F/1/00

OTHER PUBLICATIONS

Hoft, R. G.; "Semiconductor Power Electronics", 1986, Krieger Publishing Company, Page(s): 114–124.*

* cited by examiner

Primary Examiner—Lynne H. Browne
Assistant Examiner—James K. Trujillo

(57) ABSTRACT

A method and related structure for reducing the harmonic distortion on an input signal line of a switching power supply accomplished by a first or upstream power supply adjusting the input voltage such that the duty cycle of conduction or switching signals applied to each phase of a switching power supply have no significant overlap or gap.

17 Claims, 4 Drawing Sheets

SYSTEM AND METHOD FOR ADJUSTING AN INPUT VOLTAGE TO A SWITCHING POWER SUPPLY WHILE KEEPING THE OUTPUT VOLTAGE CONSTANT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to power supplies for computer systems. More specifically, the invention relates to switching power supplies for computer systems. More specifically still, the present invention relates to reducing the harmonic distortion generated by a switching power supply.

2. Background of the Invention

As computer system technology advances, specifically as manufacturing techniques related to microprocessors or central processing units (CPUs) advances, more and more transistors and related functionality are placed on a single die of a CPU. As more transistors are placed closer together on semiconductor substrates, less insulation material (in the form of oxide layers) exists between each transistor. Accordingly, CPU operating voltages are lowered to protect against electrical breakdown between transistors. However, adding transistors to a CPU increases the amount of electrical current the CPU requires. Thus, while the operating voltage for CPUs generally has been dropping as technology advances, required operating currents have steadily risen. Every computer system has a power supply that converts the 120 Volt alternating current (AC) found in a standard wall receptacle to suitable direct current (DC) voltages. This conversion from AC to DC is typically done by a switching power supply. A switching power supply should be capable of supplying current swings having transient response in the range of 100 Amps per micro-second. Thus, there are increasing demands on the capabilities of switching power supplies with each advance in CPU technology.

FIG. 1 shows an exemplary partial electrical schematic of a single phase buck-type switching power supply. The circuit shown in FIG. 1 is said to have only a single phase because it has only one switch and inductor combination. If there were several of these switch and inductor combinations present, the power supply would be considered a multi-phase switching power supply. Buck-type switching power supplies are designed to provide lower direct current (DC) voltages while supplying the current demand of a load (e.g., CPU). This ability to provide reduced DC voltages is accomplished by "chopping" the supply voltage (i.e. turning on and off at a particular frequency )via switch 1 and then averaging, by means of an inductor/capacitor circuit 2, the chopped voltage to produce DC voltage at the desired level.

In the early days of microprocessor technology, a computer system switching power supply may have had only a single phase, as explained above, inasmuch as the processor voltage and amperage requirements were such that a single phase switching power supply was capable of producing the desired voltage with the desired current. While a single phase switching power supply may be capable of meeting average voltage and current requirements, a single phase alone may not be capable of meeting higher transient requirements of modem CPUs. Another consideration in switching power supply design, especially as related to power supplies mounted on a motherboard, is the amount of space required to implement such a supply. If a single switching phase is used, the inductor and capacitor in the averaging portion of the circuit may need to be excessively large occupying too much space on the motherboard.

Increasing the number of phases in a switching power supply permits the capacitor and inductor in each phase to be smaller, as is well understood in the art. Thus, in response to demands such as space limitations and transient current response, manufacturers generally increase the number of phases in switching power supplies. However, there are various problems associated with having multiple phases in a switching power supply. For example, "harmonics" generated on the supply to the switching power supply. A harmonic, in the context of a switching power supply, is undesirable high frequency noise generated on the input signal or supply line of the switching power supply. If such harmonics are generated, it is possible that they may interfere with other components of the computer system causing improper operation.

Switching power supplies create harmonics in the process of chopping input voltages to create the desired output voltage level. Chopping of the input voltage creates significant swings in current supplied to the switching power supply. As an example, consider a buck-type switching power supply having three switching phases, each phase substantially equivalent to that shown in FIG. 1. Each phase of the switching power supply has its conducting switch 1 operable (opening and closing) at the same frequency; however, each switch activates at a different phase. FIG. 2A shows an exemplary timing diagram of the switching signals applied to the control switches of a three-phase buck-type switching power supply. The duty cycle of the switching signal applied to each control switch, in this example 50% duty cycle, is sufficiently large that two phases of the three-phase switching power supply conduct simultaneously. FIG. 2A indicates these time periods by shading. As each of these phases of the switching power supply become active, the phase draws current from the supply voltage. When two phases conduct, the current demand on the supply to the switching power supply increases over the requirement for a single phase. Thus, there are times in this example when two phases draw current from the input source simultaneously, and there are times when only a single phase draws current from the current source. A graph as function of time of the AC current demand on an input signal line for the exemplary three phase system with 50% duty cycle is shown in FIG. 3A. The higher demand times shown in FIG. 3A, in this example approximately 10 Amps AC, are the periods of time when two phases of the switching power supply are active. In an exemplary three phase system with a desired output voltage of 1.5 volts, a desired output current of 50 Amps DC, a switching frequency on a per phase basis is 200 kHz, and an inductor of each phase of 2 microhenries, the Root Mean Square (RMS) current exemplified in FIG. 3A is 8.0 Amps AC.

FIG. 2B shows switch enable signals applied to a three-phase buck-type switching power supply. The duty cycle of the switch enable signals FIG. 2B is 25% to exemplify the current distribution on the input signal when there are gaps between conducting periods of the control switches. As indicated by the shaded portions in FIG. 2B, a certain amount of time exists between conduction periods of each phase. As each phase conducts, this places a demand for current on the input to the switching power supply. FIG. 3B exemplifies a current demand on an input signal line for a three-phase switching power supply where the switch enable signals have a cycle of 25%. For such a system, the RMS current demand at the input of the three-phase switching power supply would be 8.0 Amps AC.

A single or multiple-phase switching power supply creates RMS currents on the input which create harmonics. These harmonics in some circumstances may propagate back to other devices within the computer system causing errors if they are not properly filtered. Filtering however is not an entirely acceptable solution because these filters require valuable motherboard space.

Thus, it would be desirable to have a system and/or method for reducing the RMS currents, harmonics, generated on an input to a switching power supply to alleviate the problems associated with harmonics noted above.

BRIEF SUMMARY OF THE INVENTION

The problems noted above are solved in large part by a method and apparatus whereby the input voltage to a buck-type switching power supply is adjusted such that there is little if any overlap in conduction periods of the various phases of the switching power supply, and conversely, there is little if any dead time between conduction periods. In this way, the amperage demand on the input of the switching power supply is relatively constant which reduces the RMS current and correspondingly reduces harmonics generated on the input signal line to the switching power supply.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
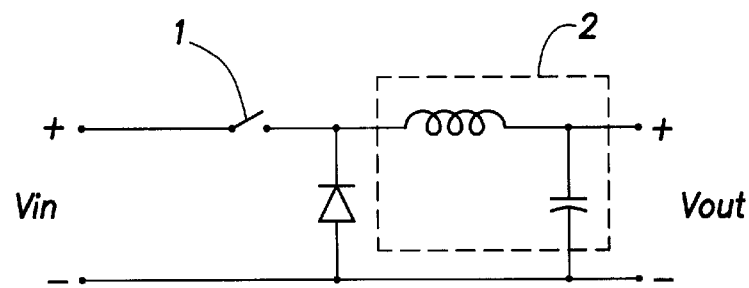
FIG. 1 shows a prior art structure of a buck-type switching power supply phase.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, connection may be through a direct electrical connection, or through an indirect electrical connection via other devices and connections.

DETAILED DESCRIPTION OF THE PREFERRED EMBODIMENTS

Switching power supplies generate RMS currents on their input signal lines by operation of the chopping feature inherent in these type supplies. This harmonic creation is most prevalent when only a single switching phase is used and decreases as the number of phases increase. A description of how to reduce this harmonic distortion however requires a brief digression into characteristics of switching power supplies.

Buck-type switching power supplies have the inherent characteristic that the ratio of their output voltage to their input voltage describes or defines the duty cycle of a switching signal which controls each phase of the switching power supply. Stated another way, the output voltage of a single phase of a buck-type switching power supply equals the input voltage multiplied by the duty cycle of the switching signal applied to the conductive element or switch. If an input voltage is held constant, lowering of the duty cycle (expressed as a percentage, e.g. 25%) works to lower the output voltage of the switching power supply. Likewise, if one is attempting to hold the output voltage of a switching power supply constant given swings of the input voltage, the duty cycle of the conduction signal applied to each switch of each phase of the switching power supply changes to compensate for the input voltage swings. As an example, consider a single phase switching power supply having an input voltage of 10 volts and a duty cycle of 50% (0.50). The output voltage for this example is 5 volts. Likewise, if the input voltage is 10 volts and the duty cycle is 25% (0.25), the output voltage is 2.5 volts. This relationship holds true even when a plurality of buck-type switching phases are connected in parallel, a multi-phase system.

For a multi-phase buck-type switching power supply, the duty cycle of the signal applied to the switches of the power supply is the same for each switching phase so that the overall output voltage of the switching power supply remains at its desired level. As each conduction signal becomes asserted, and therefore each phase of the switching power supply begins to conduct, amperage demand is made upon the input signal. If these amperage demands are simultaneous for every phase of the switching power supply, amp draw on the input to the switching power has a high AC component. It is therefore desirable that while each of the switching phases have the same switching frequency, each switching phase should operate in a different phase relationship to all the other phases. For example, if a switching power supply has two phases, the conduction signal for each phase should have the same frequency, but they should differ in phase relationship by 180 degrees. Likewise, if a switching power supply has three phases, the conduction signal for each phase should have the same frequency but vary in phase relationship by 120 degrees.

Figure 4:
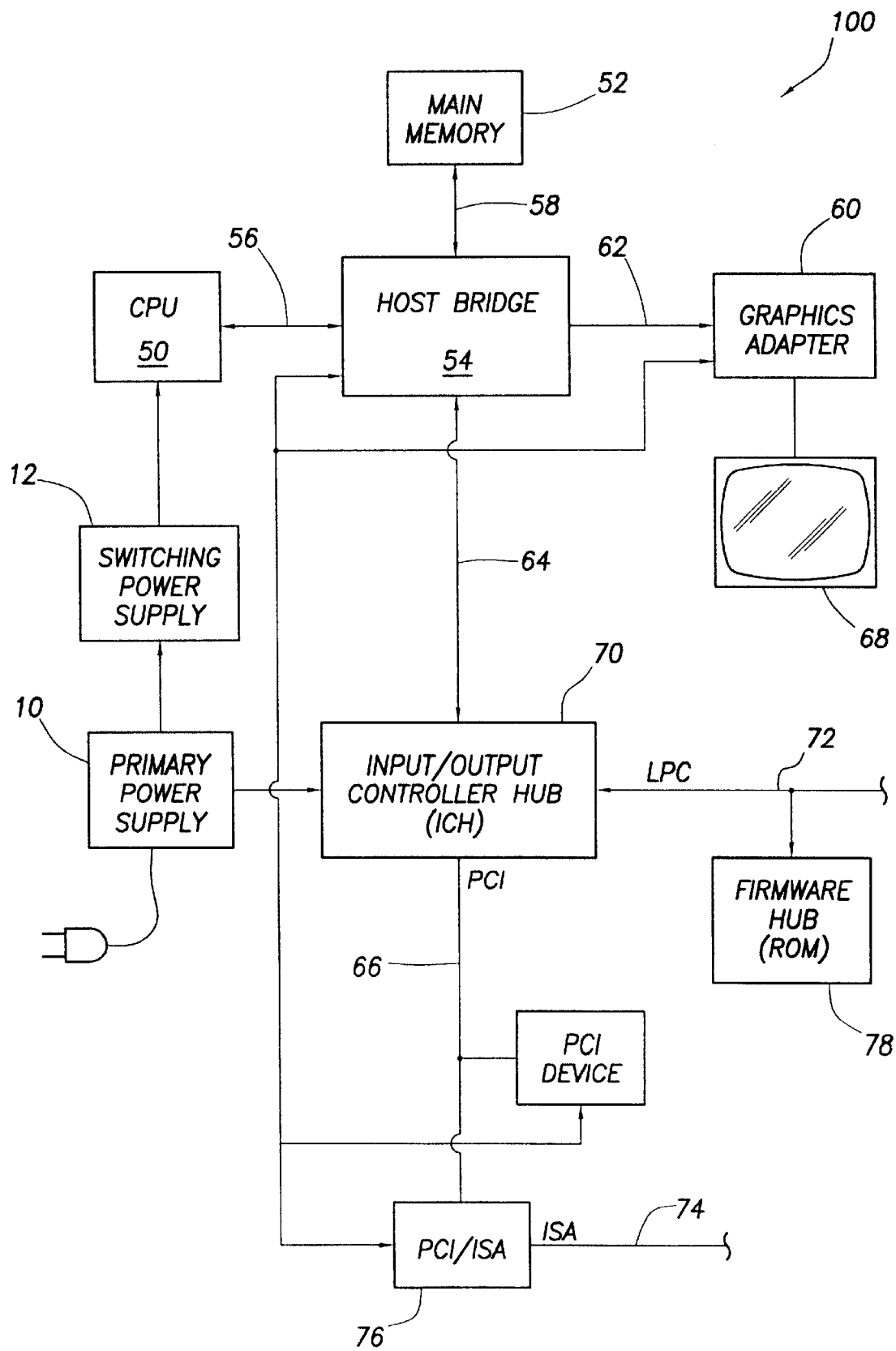
FIG. 4 is a block diagram of a computer system of the preferred embodiment.

With respect to a computer system, and as exemplified in FIG. 4, the preferred arrangement for providing current and voltage to a central processing unit (CPU) involves two power supplies. The first, or primary power supply 10, transforms and/or rectifies as necessary the 120 volt AC available at a standard wall socket. This primary power supply 10 creates a plurality of voltages for use by various system components. However, this primary power supply 10, which preferably is an individual power supply mounted within the computer system chassis but not on the motherboard itself, typically is not capable of supplying voltages and currents necessary for the latest generation of central processing units. The problem of providing the correct voltages and currents to the CPU preferably is addressed by having a switching power supply 12 which converts the DC voltages supplied by the primary power supply 10 to voltages and currents, with applicable transient response, for use by the CPU. It is noted that the primary power supply 10 itself may be a switching power supply.

Figure 2A:
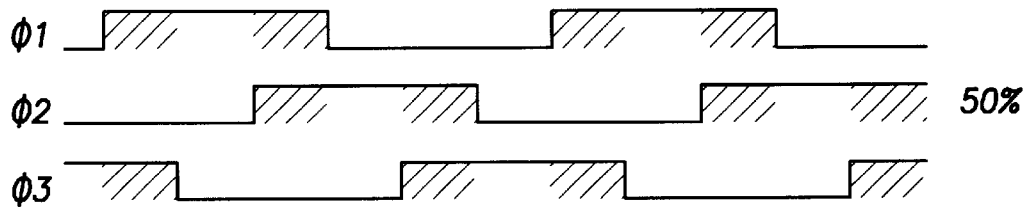
FIG. 2A shows a timing diagram of conduction signals applied to each phase of a three phase switching power supply with a duty cycle of 50%.
Figure 2B:
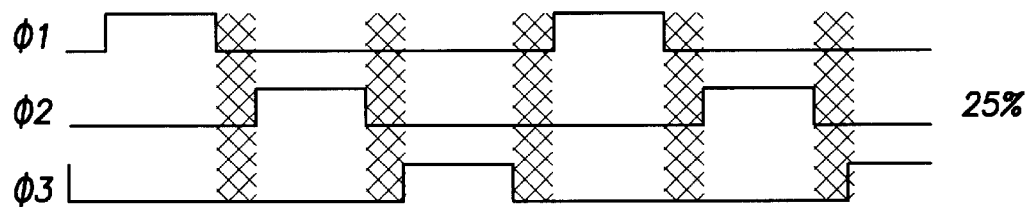
FIG. 2B shows a timing diagram of conduction signals applied to each phase of a three phase switching power supply with a duty cycle of 25%.

If the voltages supplied to the switching power supply 12 are significantly larger than the output voltage as supplied by the switching power supply 12, it is possible that the duty cycle of the conduction signals applied to the switches of each switching phase in the power supply 12 may be sufficiently small that there is a significant gap between conduction periods of switching phases (See FIG. 2B). Likewise, given the right circumstances, the ratio of the voltage supplied to the switching power supply 12 to its desired output voltage may be such that there is significant overlap of conduction periods of the phases of the switching power supply (See FIG. 2A). In each of these cases, the demands for amperage from the primary supply have a high AC component and have a high RMS amperage value. Consequently, significant harmonics may be generated by the switching power supply 12 which can propagate back to the primary power supply 10 and on to other computer system components if not properly filtered.

Figure 2C:
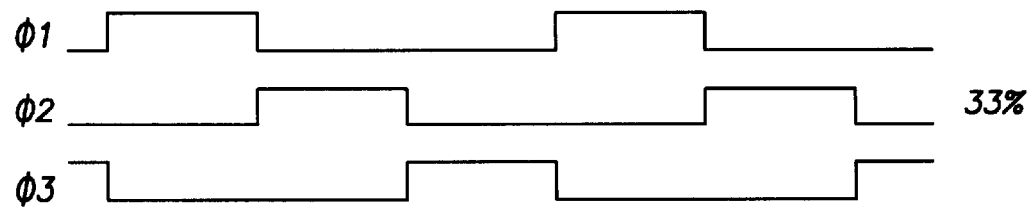
FIG. 2C shows a timing diagram of conduction signals applied to each phase of a three phase switching power supply having a duty cycle of 33%.
Figure 3A:
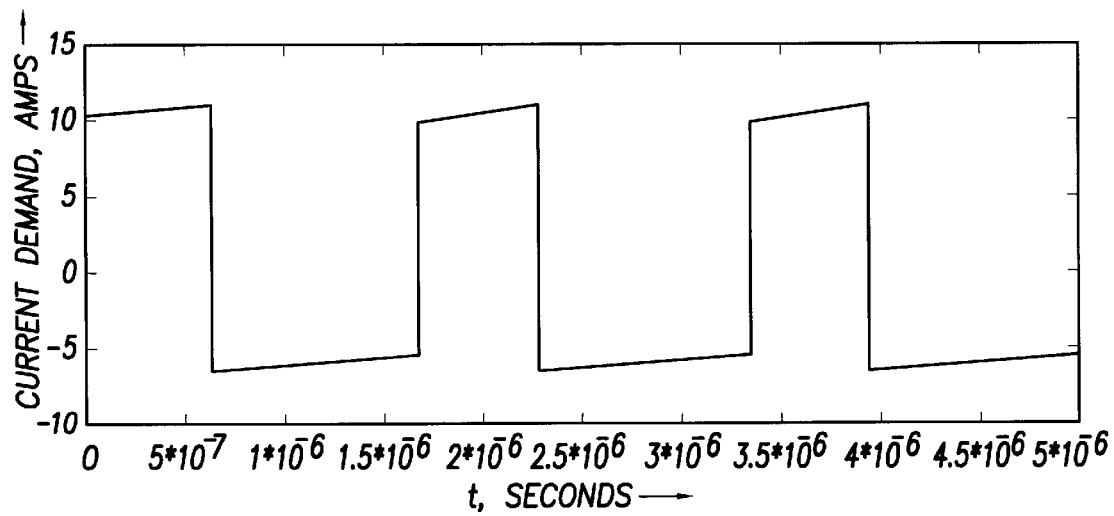
FIG. 3A shows an AC plot of input amperage demand for a three phase switching power supply whose conduction signals are exemplified in FIG. 2A.
Figure 3B:
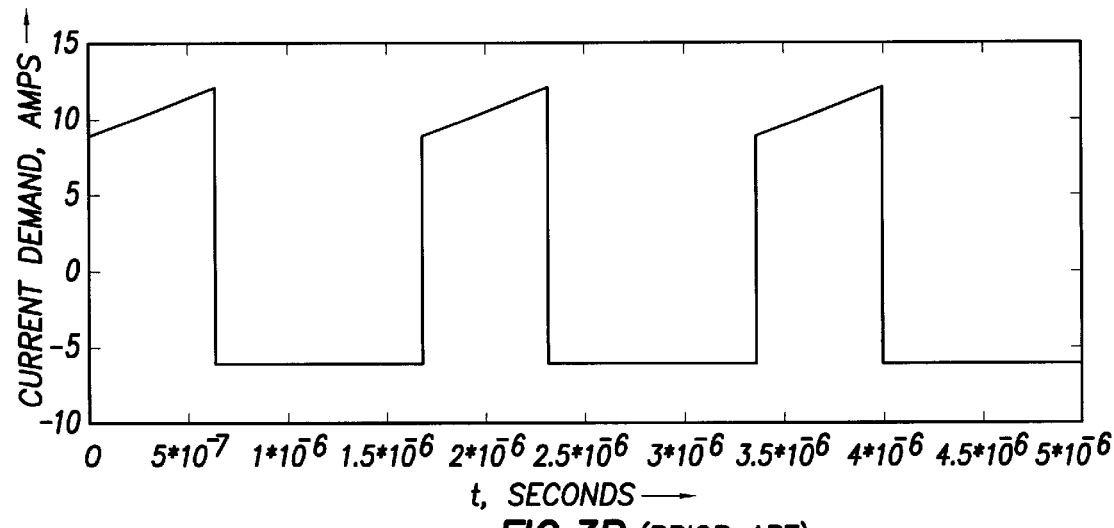
FIG. 3B shows a plot of AC input amperage demand for a three phase switching power supply whose conduction signals are exemplified in FIG. 2B.
Figure 3C:
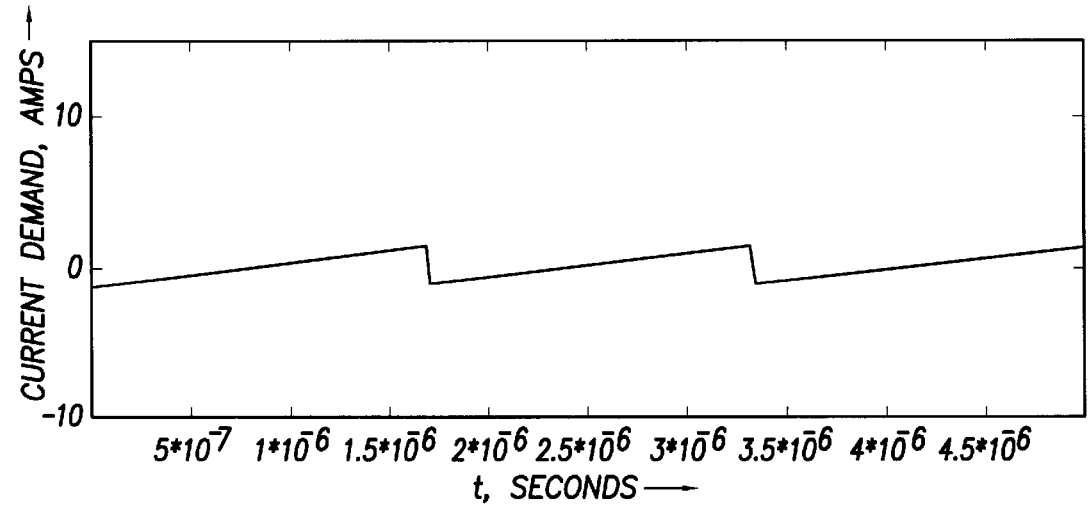
FIG. 3C shows a plot of AC input amperage demand for a three phase switching power supply whose conduction signals are exemplified in FIG. 2C.

To address the problem of harmonics, the preferred embodiment of this invention is adapted to adjust the voltage the primary power supply 10 supplies to the switching power supply 12. Harmonic distortion created by the switching power supply 12 reaches a minimum when the duty cycle of each of the switching phases of the switching power supply 12 are such that the conduction periods of each phase do not substantially overlap or do not have substantial gaps. Stated otherwise, harmonics reach a minimum when the duty cycle of the conduction signals equals 100% divided by the total number of phases of the switching power supply. For example, if there are three switching phases, the ideal duty cycle for reduction for harmonic distortion generated by the switching power supply occurs when the duty cycle equals 33.3%. FIG. 2C shows conduction signals for a switching power supply having three phases with the duty cycle of each phase being 33.3%. Assuming a switching power supply having this duty cycle, and the other parameters mentioned in the Background section of this specification, the amperage demand on the input of the switching power supply is substantially as represented in FIG. 3C. By adjusting the input voltage, and therefore the duty cycle, to match or substantially match this requirement, the RMS current, and likewise the harmonic distortion, is significantly reduced. In the exemplary waveform of FIG. 3C, the RMS current is reduced to 0.73 amps.

Figure 5:
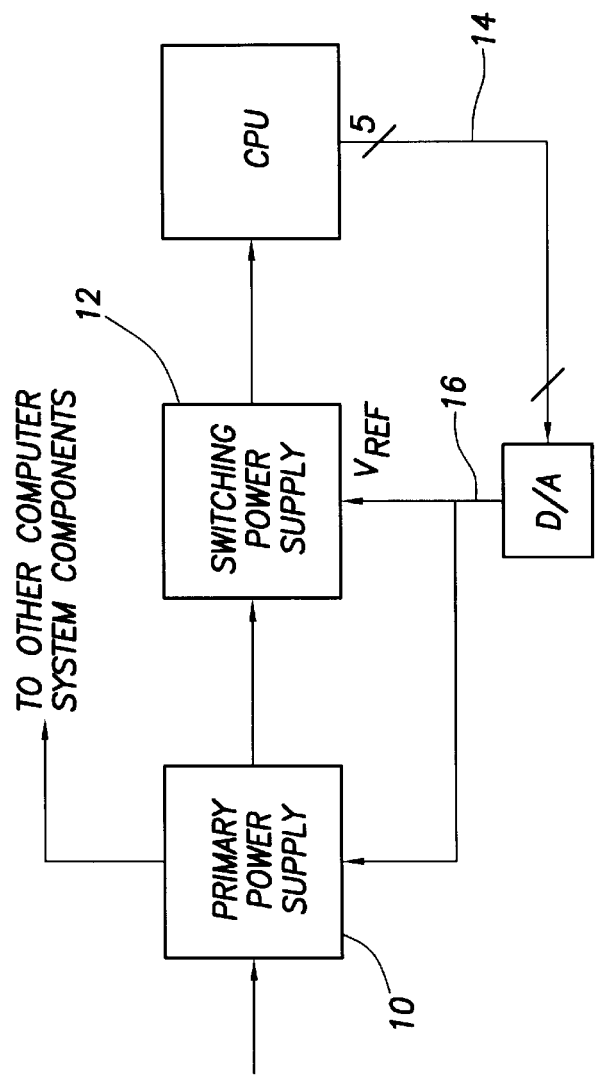
FIG. 5 is a block diagram showing coupling among computer system power supplies and the computer system's CPU.

Each CPU from a family of microprocessors may require a different voltage in a range of voltages. For example, some processors from the same family may require an operating voltage from 0.9 volts to 1.7 volts. This required voltage may change for two processors having otherwise exactly the same characteristics. Since each CPU may have a different operating voltage, each CPU likewise has the capability of informing its host motherboard of its required operational voltage. This notification preferably is done by means of 5 digital signal pins that, based on their asserted or non-asserted state, indicate the required operational voltage. As shown in FIG. 5, these digital signal pins 14 are preferably coupled to a digital to analog (D-A) converter which converts the digital representation to an analog voltage. This analog voltage becomes a reference signal 16 indicating, either directly or by multiplication of a scale factor, the correct operational voltage of the CPU. This reference voltage 16 is preferably coupled to both the switching power supply 12 and the primary power supply 10. The switching power supply 12 preferably uses this reference signal 16 to set its duty cycle to control its output voltage such that the output voltage signal 18 substantially matches the voltage of the reference signal 16. To keep the same output voltage of the switching power supply 12 given the change in voltage supplied by the primary supply 10, the switching power supply 12 preferably adjusts its duty cycle to compensate for the change in input voltage. Thus, the primary power supply 10, knowing the final voltage to be supplied to the CPU, can adjust the voltage applied to the input of the switching power supply 12 such that the duty cycle of the conduction signals for each phase of the switching power supply do not substantially overlap or have gaps in their conduction periods to reduce harmonic distortion.

Figure 6:
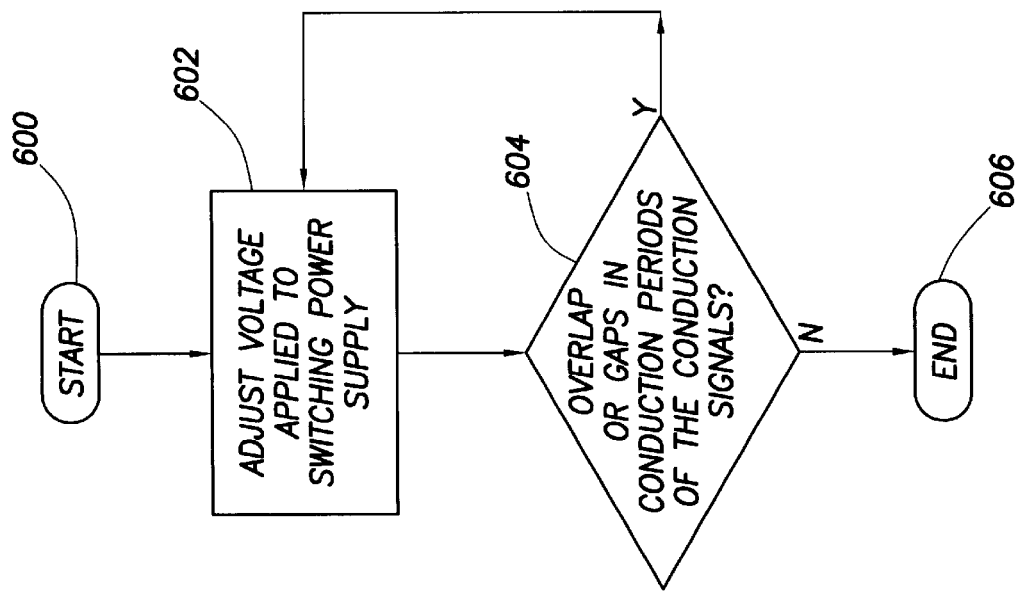
FIG. 6 illustrates a flow diagram in accordance with embodiments of the invention.

FIG. 6 illustrates a flow diagram in accordance with embodiments of the invention. In particular the process may start (block 600) and proceed to adjusting the voltage applied to the switching power supply (block 602). If there are overlaps or gaps in the conduction periods of the conduction signals (block 604), further adjusting of the voltage may be required (block 602). If there are no substantial overlaps or gaps of the conduction signals, the process may end (block 606).

FIG. 4 shows the preferred embodiment computer system 100 implementing the improvements disclosed herein. Shown is FIG. 4 is a CPU 50 coupled to a main memory 52 and various other peripheral computer system components through an integrated host bridge 54. The CPU 50 preferably couples to the host bridge 54 via a host bus 56, or the host bridge logic 54 may be integrated into the CPU 50. The CPU 50 may comprise, for example, Intel's new microprocessor discussed above. It should be understood, however, that the computer system 100 could include many other alternative microprocessors. Thus, the computer system may implement other bus configurations or bus bridges in addition to, or in place of, those shown in FIG. 4.

Main memory 52 preferably couples to the host bridge 54 through a memory bus 58. The host bridge 54 preferably includes a memory control unit (not shown) that controls transactions to the main memory 52 by asserting the necessary control signals during memory accesses. The main memory 52 functions as the working memory for the CPU 56 and generally includes a conventional memory device or array of memory devices in which programs, instructions and data are stored. The main memory 52 may comprise any suitable type of memory such as dynamic random access memory (DRAM) or any of the various types of DRAM devices such as synchronous DRAM (SDRAM), extended data output DRAM (EDO DRAM), or RAMBUS™ (RDRAM). The computer system 100 also preferably includes a graphics controller or video driver card 60 that couples to the host bridge 54 via an advanced graphics port (AGP host) bus 62. Alternatively, the video driver card 60 may couple to the primary expansion bus 64 or one of the secondary expansion buses, for example, the PCI bus 66. Graphics controller 60 further couples to a display device 68 which may comprise any suitable electronic display device upon which any image or text can be represented.

The computer system 100 preferably includes an input/output controller hub (ICH) 70. The ICH 70 acts as a bridge logic device bridging the primary expansion bus 64 to various secondary buses including a low pin count (LPC bus) 72 and a peripheral components interconnect bus 66. Although the ICH is shown only to support the LPC bus 72 and the PCI bus 66, various other secondary buses may be supported.

In the preferred embodiment shown in FIG. 4, the primary expansion bus 64 comprises a hub-link bus. Hub-link is a proprietary bus of the Intel™ Corporation. However, computer system 100 is not limited to any particular type of primary expansion bus, and thus, various buses may be used. Industries standard architecture (ISA) bus 74 is shown in the preferred embodiment coupled to the ICH 70 by way of a PCI to ISA bridge device 76.

Also shown in FIG. 4 is a firmware hub 78. The firmware hub 78 couples to the ICH 70 by way of the LPC bus 72. The firmware hub 78 preferably comprises read only memory (ROM) which contains software programs executed by the CPU 50. The software programs preferably include both instructions executed during power on self tests (POST) procedures and basic input/output systems (BIOS) commands. These software programs perform various functions including verifying proper operation of various computer system components before control of the system is turned over to the operating system.

The combination of the primary power supply 10 and switching power supply 12 provide the required voltages and current for the CPU 50 of the computer system 100. Preferably, the primary power supply 10 is adapted to adjust the voltage signal provided to the switching power supply 12 so that harmonics generated by the switching power supply 12 are reduced to a minimum. Likewise, switching power supply 12 preferably comprises a switch enable generation circuit 20 adapted to generate the necessary switch enable signals 34 for the various phases of the switching power supply 12.

The above discussion is meant to be illustrative of the principles and various embodiments of the present invention. Numerous variations and modifications will become apparent to those skilled in the art once the above disclosure is fully appreciated. For example, it may be possible that the switching power supply 12 need not receive the reference signal 16. If the primary power supply 10 is capable of efficiently supplying the proper input voltage to the switching power supply 12, it may be possible that the duty cycle for each phase can be locked into the design and still be within the contemplation of this invention. Also, although the preferred embodiment is disclosed as having two distinct power supplies, one mounted on the motherboard and another mounted in a separate location, it may be possible that the functionality described with reference to the two distinct power supplies could be housed in a single location off the motherboard. It is intended that the following claims be interpreted to embrace all such variations and modifications.

What is claimed is:

1. A method comprising:
    adjusting the magnitude of a DC input voltage to a switching power supply;
    adjusting a duty cycle of a plurality of switching phases of the switching power supply in response to the adjusting of the DC input voltage such that an output voltage of the switching power supply remains substantially constant; and
    repeating the adjusting the magnitude and adjusting the duty cycle until the sum of the duty cycles of each phase is approximately 100%.

2. The method as defined in claim 1 wherein the sum of the duty cycles of each phase is equal to 100%.

3. The method as defined in claim 1 wherein the sum of the duty cycles of each phase is less than or equal to 100%.

4. The method as defined in claim 1 wherein there are 10 switching phases in said switching power supply and each phase has a duty cycle of approximately 10%.

5. The method as defined in claim 1 further comprises the switching power supply providing a lower voltage at its output signal than is provided as its input voltage.

6. The method as defined in claim 1 wherein adjusting the magnitude of a DC input voltage further comprises adjusting the magnitude by a primary power supply having a output voltage coupled to the input voltage of the switching power supply.

7. A method of reducing harmonics generated on a voltage input signal to a buck-type switching power supply comprising:
    adjusting a magnitude of a voltage on the voltage input signal while keeping output voltage constant such that a duty cycle of a switch signal applied to a switch of each phase of the switching power supply substantially matches a value indicated by the following equation:

$$\text{duty cycle} = 100\% \div \Phi$$

wherein $\Phi$ is the number of phases in the switching power supply.

8. The method as defined in claim 6 wherein adjusting the voltage input signal further comprises adjusting the voltage input signal to substantially match a value indicated by the following equation:

$$\text{voltage\_input\_signal} = V_{out} \times \Phi$$

wherein Vout is a voltage supplied at an output of the switching power supply, and $\Phi$ is the number of phases in the switching power supply.

9. The method as defined in claim 7 further comprises adjusting the voltage input signal by a power supply coupled to the buck-type switching power supply.

10. A power supply system of a computer, comprising:
    a primary power supply having a primary power supply output signal;
    a switching power supply coupled to said primary power supply via said supply output signal, said switching power supply providing a power supply output signal, and having a plurality of switching phases; and
    wherein while the switching power supply keeps the supply output signal constant said primary power supply adjusts the voltage of the primary power supply output signal to a voltage level that makes a summation of the duty cycles of switching signals, each expressed as a percentage, of each of the plurality of switching phases approximately 100%.

11. The structure as defined in claim 10 further comprising:
    a reference signal generated by a CPU coupled to said primary power supply and said switching power supply, wherein said reference signal represents a desired voltage level on the power supply output signal from the switching power supply; and said primary power supply adjusts the primary power supply output signal responsive to said reference signal.

12. The structure as defined in claim 11 wherein said primary power supply adjusts the primary power supply output signal to be substantially equal to Vref×β×Φ, wherein Vref is the reference signal, β is a scale factor applied to Vref, and Φ is the number of phases of the switching power supply.

13. The structure as defined in claim 12 wherein said scale factor β equals 1.0 and therefore the reference signal voltage equals a desired power supply output signal voltage.

14. The structure as defined in claim 12 wherein the number of phases of the switching power supply, Φ, is less than five.

15. The structure as defined in claim 11 wherein said primary power supply adjusts the primary power supply output signal to be substantially equal to Vref×Φ, wherein Vref is the reference signal and Φ is the number of phases of the switching power supply.

16. A computer system comprising:

a processor;

a memory coupled to the processor;

a primary power supply having a primary power signal; and a switching power supply having a plurality of switching phases, the switching power supply coupled on an input side to the primary power signal, and the switching power supply having an output power signal coupled to the processor;

wherein the primary power supply adjusts the magnitude of the voltage on the primary power signal, with a voltage on the output power signal remaining constant, until a sum of the duty cycles of each switching phase is approximately 100%.

17. A power supply system comprising:

a primary power supply;

a switching power supply coupled to said primary power supply, said switching power supply providing a power supply output signal, and having a plurality of switching phases; and wherein the primary power supply adjusts the magnitude of the voltage coupled to the switching power supply, while the voltage on the power supply output signal remains constant, until a sum of the duty cycles of each switching phase is approximately 100%.

* * * * *